Oct. 14, 1969 N. J. GROOM 3,473,050
VARIABLE PULSE WIDTH MULTIPLIER
Filed June 10, 1966

INVENTOR
NELSON J. GROOM

BY
G. T. McCoy
William H. King
ATTORNEYS

3,473,050
VARIABLE PULSE WIDTH MULTIPLIER

Nelson J. Groom, Newport News, Va., assignor to the United States of America as represented by the Administrator of the National Aeronautics and Space Administration Filed June 10, 1966, Ser. No. 556,784
Int. Cl. H03k *1/18*
U.S. Cl. 307—267 1 Claim

ABSTRACT OF THE DISCLOSURE

A device for producing an output pulse whose duration is proportional to the duration of an input pulse. Means are provided for linearly discharging a fully charged capacitor throughout the duration of the input pulse. Thereafter the capacitor recharges to its fully charged state. Means are connected to the capacitor for producing a pulse beginning at the time the capacitor begins to discharge and ending at the time the capacitor becomes fully recharged. Means are provided for changing the discharge and recharge rates of the capacitor.

Figure 1:
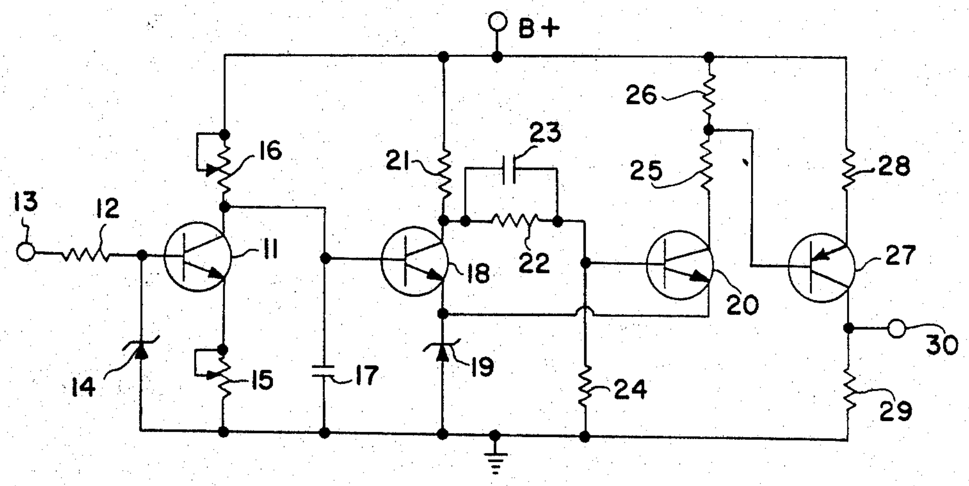

The invention described herein was made by an employee of the United States Government and may be manufactured and used by or for the Government for governmental purposes without the payment of any royalties thereon or therefor.

The invention relates generally to a pulse duration multiplier and more specifically concerns a device for receiving input pulses and producing output pulses whose durations are proportional to the durations of the input pulses.

It is sometimes desirable to increase the durations of the pulses in a train of pulse duration modulated pulses. For example, if these pulses are utilized in an electro-mechanical device, the device will be responsive to only those pulses having durations above a certain value. Pulses having durations below this certain value will not overcome the inertia of the mechanical system. Consequently, if the duration of each pulse is multiplied by some constant greater than one the pulses can be more effectively used in an electro-mechanical device.

There is no pulse duration multiplier known by the invention. There are many types of pulse stretchers; however, these devices provide a constant output pulse regardless of the duration of the pulse being stretched. Therefore there is not proportionality between input and output pulses. Consequently, if these pulse stretchers are used to stretch pulse duration modulated pulses, the stretched pulses will no longer be pulse duration modulated.

It is therefore an object of this invention to provide a device for multiplying the durations of pulse duration modulated pulses by a constant greater than one.

Another object of this invention is to increase the durations of pulse duration modulated pulses so that they can be more effectively used in an electromechanical device.

A further object of this invention is to provide a device for stretching pulses proportional to their durations.

Figure 2:
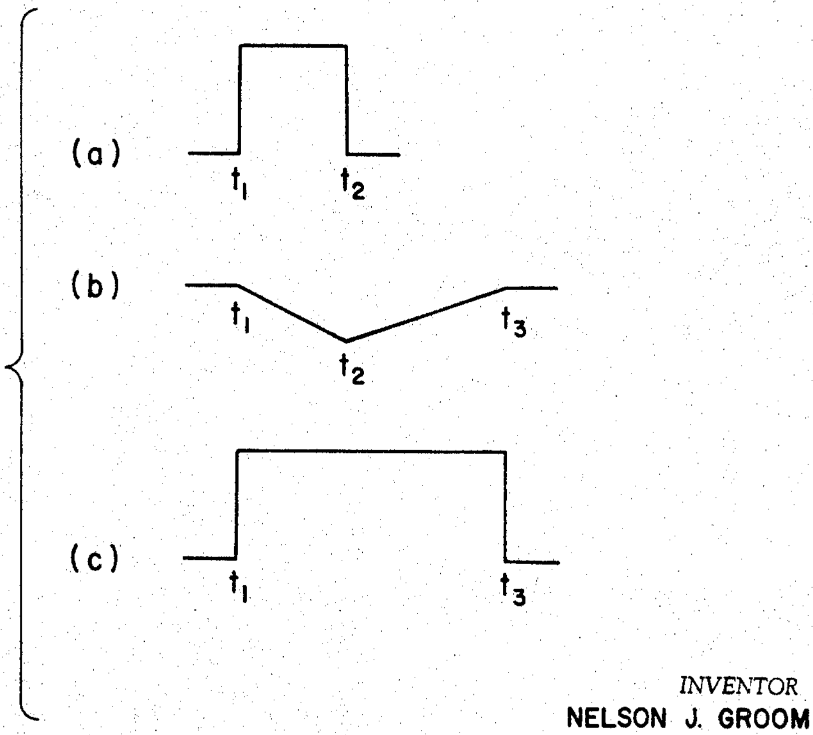

Other objects and advantages of this invention will further become apparent hereinafter and in the drawings in which:

FIG. 1 is a schematic circuit drawing of a preferred embodiment of the invention; and FIG. 2 is a series of waveforms useful in explaining the operation of the circuit in FIG. 1.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Turning now to the specific embodiment of the invention selected for illustration in the drawings, the number 11 designates an NPN transistor. The base of transistor 11 is connected through a resistor 12 to an input terminal 13, and through a Zener diode 14 to ground. The emitter of transistor 11 is connected through a variable resistor 15 to ground. The collector of transistor 11 is connected through a variable resistor 16 to a B+ power supply, through a capacitor 17 to ground, and directly to the base of an NPN transistor 18. The emitter of transistor 18 is connected through a Zener diode 19 to ground and directly to the emitter of an NPN transistor 20. The collector of transistor 18 is connected through a resistor 21 to the power supply and through the parallel combination of a resistor 22 and a capacitor 23 to the base of transistor 20. The base of transistor 20 is also connected through a resistor 24 to ground. The collector of transistor 20 is connected through a resistor 25 and a resistor 26 to the power supply. The junction of resistors 25 and 26 is connected to the base of a PNP transistor 27. The emitter of transistor 27 is connected through a resistor 28 to the power supply. The collector of transistor 27 is connected through a resistor 29 to ground, and directly to an output terminal 30.

The pulse duration multiplier shown in FIG. 1 consists basically of four parts. These parts are: (1) the capacitor 17; (2) a charge source consisting of variable resistor 16; (3) a discharge source consisting of transistor 11, variable resistor 15 and Zener diode 14; and (4) a level detector consisting of transistors 18 and 20, and the associated circuitry. Transistor 27 merely serves as a switch to reference the output to ground. The level detector is the well known Schmitt trigger circuit.

The operation of the pulse duration multiplier shown in FIG. 1 will now be described while referring to the waveforms in FIG. 2. Under quiescent conditions transistor 11 is not conducting and capacitor 17 is charged through resistor 16 to a voltage determined by Zener diode 19. The resulting voltage across capacitor 17 puts a forward bias on the base-emitter diode of transistor 18 causing it to conduct which in turn causes transistor 20 to become nonconductive. Since transistor 20 is not conducting the base and emitter of transistor 27 are at the same potential, transistor 27 is not conducting and output terminal 30 is at ground potential. When a square wave pulse, such as the one shown in FIG. 2(*a*), is applied to input terminal 13, the leading edge of the pulse at a time $t_1$ causes transistor 11 to start conducting. As soon as transistor 11 starts conducting, capacitor 17 begins to discharge through transistor 11 and resistor 15. The resulting voltage drop across resistor 15 is clamped to a voltage determined by Zener diode 14. Therefore the discharge of capacitor 17 is essentially linear. Zener diode 19 in addition to its function as voltage limiter to capacitor 17, also determines the trip point of the level detector and provides essentially zero hysteresis. Therefore, as soon as the voltage across capacitor 17 starts decreasing at time $t_1$, as shown in FIG. 2(*b*), transistor 18 becomes nonconductive, and transistors 20 and 27 start conducting. The resulting voltage drop across resistor 29 at output terminal 30 is shown at time $t_1$ in FIG. 2(*c*). This is the leading edge of the output pulse. At the time $t_2$, when the input pulse is terminated, transistor 11 becomes nonconductive and capacitor 17 is recharged through resistor 16. When the voltage across capacitor 17 reaches the Zener voltage of Zener diode 19 at time $t_3$, transistor 18 again becomes conductive, transistors 20 and 27 become nonconductive and the voltage at terminal 30 returns to ground potential to produce the trailing edge of the output pulse of FIG. 2(*c*).

As can readily be seen from FIG. 2, the duration of the pulse at output terminal 30 (FIG. 2(*c*)) is directly proportional to the duration of the pulse at input terminal 13 (FIG. 2(*a*)). The multiplication factor is $$\frac{t_1-t_3}{t_1-t_2}$$

This multiplication factor can be changed either by varying resistor 15 or by varying resistor 16. The value of resistor 15 determines the rate of discharge of capacitor 17 and thus determines the slope of waveform FIG. 2(*b*) between the times $t_1$ and $t_2$. The value of resistor 16 determines the rate of charge of capacitor 17 and thus determines the slope of waveform FIG. 2(*b*) between the times $t_2$ and $t_3$. The linearity of the charge circuit is due to the fact that only a small almost linear portion of the charge curve of the capacitor 17 is utilized. An alternate method would involve the use of a variable constant current charge source in place of variable resistor 16. However, this would require at least one extra transistor and add to the complexity of the circuit.

The following circuit component values have been used in the circuit in FIG. 1 and found to operate satisfactorily:

| | | |
|---|---|---|
| Resistor: | | |
| **12** | kilohms | 10 |
| **15** | ohms | 110 |
| **16** | kilohms | 23 |
| **21** | do | 6.6 |
| **22** | do | 3.3 |
| **24** | do | 4.7 |
| **25** | do | 5.6 |
| **26** | do | 1 |
| **28** | ohms | 100 |
| **29** | kilohms | 10 |
| Capacitor: | | |
| **17** | microfarads | 10 |
| **23** | do | .001 |
| Zener diodes: | | |
| **14** | | IN753A |
| **19** | | IN757A |
| Transistor: | | |
| **11** | | 2N697 |
| **18** | | 2N697 |
| **20** | | 2N697 |
| **27** | | 2N722 |

The multiplication factor was set at 50 with an input pulse duration of .1 millisecond.

The multiplication factor can be varied from 1 to a maximum determined by the input pulse duration and pulse repetition rate by varying resistor 16. The pulse duration range over which the pulse duration multiplier will operate can be varied by changing resistor 15. This range is determined by the lowest pulse duration which will operate the pulse duration multiplier, the multiplication factor, and the pulse repetition rate. For example, the pulse duration multiplier will operate reliably down to 10 microseconds with a multiplication factor of 50 and a pulse repetition rate of 2 per second and it will operate over a range of from 10 microseconds to 10 milliseconds, or three orders of magnitude of input pulse duration change.

The advantage of this invention is that it provides a device for multiplying the durations of pulse duration modulated pulses by some constant greater than one. The invention is useful when pulse duration modulated pulses are applied to a control system that has a response time greater than the durations of the pulses. The invention could also be used as a pulse duration modulator by adding voltage control of the charge rate of capacitor 17. A modulating voltage could then be applied to the charge control exerting any amount of modulation above the input pulse duration.

It is to be understood that the form of the invention herewith shown and described is to be taken as a preferred embodiment. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the following claims.

What is claimed as new and desired to be secured by Letters Patent of the United States is:

1. A pulse duration multiplier comprising:
a first resistor and a capacitor connected in series between a voltage source and ground;
a pulse responsive gate with an input that is conductive while an input pulse is applied to it and is nonconductive while an input pulse is not applied to it;
said gate connected in series with a second resistor between the junction of said first resistor and said capacitor and ground whereby while an input pulse is applied to said gate said capacitor discharges through said gate and said second resistor and while an input pulse is not applied to said gate said capacitor recharges through said first resistor;
a Zener diode connected between the input of said gate and ground to insure that said capacitor discharges linearly; and
means including a Schmitt trigger circuit connected to the junction between said first resistor and said capacitor for producing an output pulse beginning at the time when said capacitor begins to discharge and ending at the time said capacitor is fully recharged whereby said output pulse begins at the beginning of an input pulse and has a duration proportional to the duration of said input pulse.

References Cited

UNITED STATES PATENTS

| | | | |
|---|---|---|---|
| 3,152,267 | 10/1964 | Clapper | 307—265 |
| 3,346,743 | 10/1967 | Strenglein | 328—58 XR |

ARTHUR GAUSS, Primary Examiner

J. ZAZWORSKY, Assistant Examiner

U.S. Cl. X.R.

328—58; 329—106; 332—9